(No Model.)
H. A. HUEFFNER.
BOLTING REEL.
No. 397,057. Patented Jan. 29, 1889.
Fig. I.
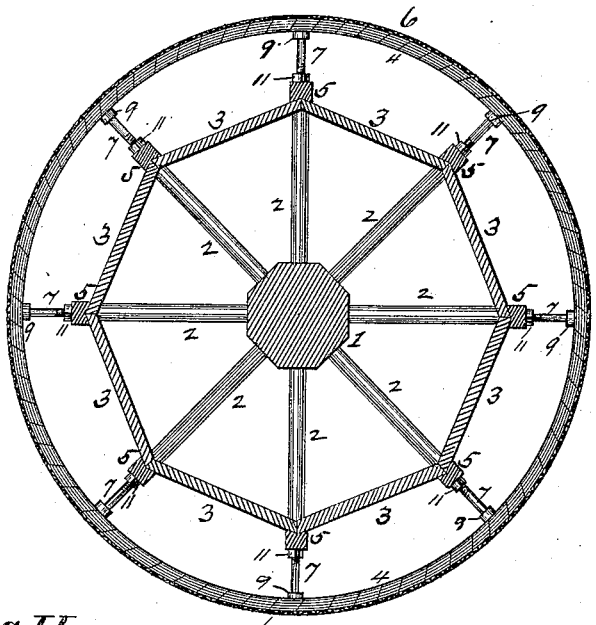
Fig. II.
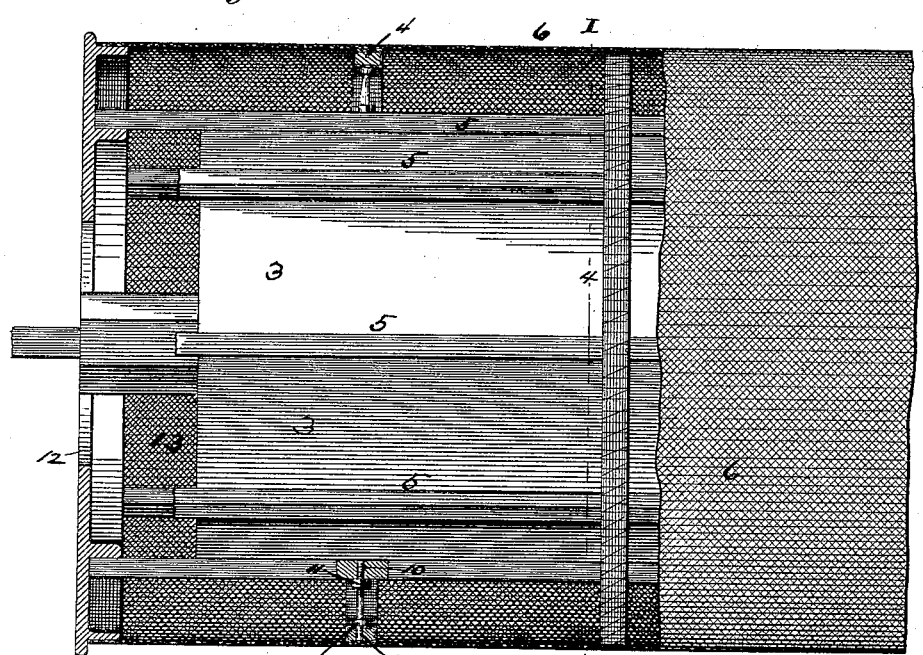
Attest:
E. Arthur
Geo. E. Cruse
Inventor:
Henry A. Hueffner
By Knight Bro
Attys

United States Patent Office.

HENRY A. HUEFFNER, OF PALMER, ILLINOIS.

BOLTING-REEL.

SPECIFICATION forming part of Letters Patent No. 397,057, dated January 29, 1889.

Application filed August 22, 1888. Serial No. 283,405. (No model.)

*To all whom it may concern:*

Be it known that I, HENRY A. HUEFFNER, of Palmer, in the county of Christian and State of Illinois, have invented a certain new and useful Improvement in Bolting-Reels, of which the following is a full, clear, and exact description, reference being had to the accompanying drawings, forming part of this specification, and in which—

Figure I is a transverse section through the reel, taken on line I I, Fig. II. Fig. II is a detail view, part in side elevation and part in longitudinal section.

My invention relates to certain improvements in the construction of reels for bolting flour; and my invention consists in features of novelty, hereinafter fully described, and pointed out in the claims.

Referring to the drawings, 1 represents the center shaft or core of the reel, to which is secured a number of radiating arms or spokes, 2. To the outer ends of these spokes are secured strips 3, as shown plainly in Fig. I.

4 represents a series of rings wrapped with cloth or fabric, and which support the bolting silk or cloth 6.

5 represents longitudinal bars or strips placed opposite the spokes 2 and covering the joints between the strips 3. These bars hold the strips 3 on the spokes 2, and they in turn are held by bolts or rods 7, which have ends 8, (see Fig. II,) that enter holes in the rings 4, and shoulders 9, that fit against the rings. The inner ends of the rods are threaded, as shown at 10, Fig. II, and which enter the bars 5. On the threaded portions of the rods are nuts 11. By tightening the nuts the bars 5 may be clamped down tightly upon the strips 3 and a secure joint is obtained.

The flour is deposited into the reel between the silk and the strips 3 through an opening, 12, in the head of the reel, there being a space, 13, between the head of the reel and the ends of the strips, as shown in Fig. II.

The bars or strips 5, besides forming a tight joint for the strips 3, act an elevator of the material to be treated, which assists greatly in the bolting.

I claim as my invention—

1. In a bolting-reel, the combination of the central shaft or core, spokes or arms radiating from the central shaft or core, strips 3, fitting on the outer ends of the arms or spokes, bars 5, covering the joints between the strips, rings 4, silk 6, and rods 7 between the rings and bars, substantially as and for the purpose set forth.

2. In a bolting-reel, the combination of the central shaft or core, 1, radiating spokes or arms 2, strips 3, bars 5, covering the joints between the strips, rings 4, silk 6, and rods 7 between the bars 5 and the rings 4, said rods having shoulders 9 on one end and being threaded and having nuts 11 on the other end, substantially as and for the purpose set forth.

HENRY A. HUEFFNER.

In presence of—
PHILLIP STADLER,
C. M. FERGUSON.